United States Patent [19]
Evans

[11] Patent Number: 5,402,957
[45] Date of Patent: Apr. 4, 1995

[54] WEB SUPPLY/TAKE-UP TENSION ARM FEEDBACK SYSTEM

[75] Inventor: Stuart G. Evans, Rochester, N.Y.

[73] Assignee: Eastman Kodak Company, Rochester, N.Y.

[21] Appl. No.: 150,330

[22] Filed: Nov. 9, 1993

Related U.S. Application Data

[63] Continuation of Ser. No. 922,121, Jul. 29, 1992, abandoned.

[51] Int. Cl.⁶ .............................................. B65H 59/38
[52] U.S. Cl. .................................. 242/353; 242/420.6
[58] Field of Search ............... 242/186, 187, 189, 190, 242/191, 75, 75.3, 75.4, 75.43, 75.44, 75.5, 75.51, 75.52, 353, 420.6; 226/44; 318/6; 360/73.02, 74.3

[56] References Cited

U.S. PATENT DOCUMENTS

| | | |
|---|---|---|
| 3,092,764 | 6/1963 | Cooper ............................ 318/6 |
| 3,441,825 | 4/1969 | Dinger ............................. 318/6 |
| 3,484,057 | 12/1969 | Hammond .................... 242/208 |
| 3,718,289 | 2/1973 | Alaimo .......................... 242/190 |
| 3,731,890 | 5/1973 | Ruoff et al. ............. 242/75.52 X |
| 3,780,959 | 12/1973 | Burth ........................... 242/55.18 |
| 4,350,454 | 9/1982 | Schoenlein ..................... 400/234 |
| 4,429,261 | 1/1984 | Ohno ......................... 242/190 X |
| 4,438,891 | 4/1984 | Wiig .............................. 242/190 |
| 4,550,885 | 11/1985 | Graham ........................ 242/204 |
| 4,736,900 | 4/1988 | Okamura ................... 242/75.52 |
| 4,739,948 | 4/1988 | Rodal et al. .................. 242/190 |
| 4,807,107 | 2/1989 | Fincher ......................... 364/148 |
| 4,958,782 | 9/1990 | Dannatt et al. ............. 242/75.43 |

FOREIGN PATENT DOCUMENTS

| | | |
|---|---|---|
| 873328 | 11/1959 | United Kingdom . |
| 1158896 | 9/1966 | United Kingdom . |
| 1194771 | 1/1969 | United Kingdom . |

Primary Examiner—Daniel P. Stodola
Assistant Examiner—Darling: John P.
Attorney, Agent, or Firm—Frank Pincelli

[57] ABSTRACT

A nonlinear feedback positioning system that maintains relatively uniform tension in a web that travels between a reel and a drive at a position that is between the reel and the drive. The feedback system is designed to maintain a web loop at relatively uniform length and regulate the tension that is applied to the web that is wound on the reel.

7 Claims, 2 Drawing Sheets

WEB SUPPLY/TAKE-UP TENSION ARM FEEDBACK SYSTEM

This is a Continuation of application Ser. No. 07/922,121, filed 29 Jul. 1992, now abandoned.

BACKGROUND OF THE INVENTION

Field of Invention

This invention relates generally to the field of material transport systems and particularly to a web transport system.

Description of the Prior Art

Material transport systems, i.e. film handling systems move various types of materials from one location to another. A film handling system may be contained within a photographic printer. The film handling system is used to move a filmstrip between printer devices, i.e. DX code readers, notch detectors, splice print count readers, splice bar code readers and pixel density scanners, etc. The aforementioned devices operate on the premise that the filmstrip will move at a very constant forward speed, with no chance of even the slightest backward motion.

A constant tension allows the filmstrip to move forward smoothly from device to device without jerking forward or jerking backward.

Thus, it is desirable to maintain constant tension in the filmstrip supply reel and the filmstrip takeup reel. Hence, the sensors and mechanisms between the filmstrip supply reel and the filmstrip takeup reel would not have to compensate for film tension spikes generated by the filmstrip supply reel and the filmstrip takeup reel. Unfortunately, the tension between the filmstrip supply reel and the filmstrip takeup reel of prior art film handling systems is not constant.

A prior art system reduced the tension at the filmstrip supply reel by wrapping the filmstrip over a tension arm that has a preloaded spring. As the filmstrip moved out of the filmstrip supply reel, the tension arm moved to a motor turn on switch reel point which turned on a spindle motor switch. Whereupon, the spindle motor would move the filmstrip so that the filmstrip would form a loop. When enough filmstrip was placed in the loop, the tension arm would encounter a motor turn off switch point. At this juncture the motor would be turned off and an electromechanical brake would be applied to the spindle to keep the filmstrip tension from turning the motor. An analogous but opposite situation occurs at the filmstrip takeup reel as the filmstrip is fed into the takeup reel.

Problems to be Solved by the Invention

The tension in the spring causes the tension in the filmstrip. As long as the tension arm is in contact with the filmstrip, the filmstrip tension is relatively constant. The filmstrip, however, is not prevented from momentarily leaving the tension arm. When the filmstrip supply reel is full, the motor and the filmstrip supply reel can supply filmstrip faster than the tension arm can move. The tension arm has some inertia and friction that limits its response time. This condition causes the filmstrip tension to drop to zero, and then spike very high when the tension arm hits the filmstrip.

Another disadvantage of the foregoing was that the above stressed the electromechanical brake by requiring the electromechanical brake to regularly stop the motor and filmstrip supply reel when they are moving at peak velocity.

A further disadvantage of the foregoing was that the above would only operate in the forward direction. Additional control mechanisms had to be added to allow the filmstrip to travel in the opposite direction.

The prior art also utilized a closed loop linear feedback control system that included a linear servo motor and controller. This system reduced tension at the supply or takeup reels by constantly trying to drive a tension arm to its center position. A disadvantage of the above system was that the system was expensive.

SUMMARY OF THE INVENTION

The present invention overcomes the disadvantage of the prior art by providing a non-linear feedback positioning system that maintains relatively uniform tension in a web that travels between a reel and a drive. This reduces potential web damage and enables more accurate readings of the web characteristics to be obtained.

The foregoing is accomplished by providing a device for controlling a web that travels between a reel and a drive, the device comprises:

means for causing a length of the web to form a loop between the reel and the drive;

means coupled to the reel for regulating the length of the web that forms in the loop; and means coupled to the regulating means and responsive to the length of the web that forms the loop for sensing the length of the loop in a manner such that if more than a predetermined length of the web is in the loop the regulating means will remove a portion of the web from the loop to maintain a relatively uniform tension in the web between the reel and the drive, and if less than a predetermined length of the web is in the loop the regulating means will add a portion of the web to the loop to maintain a relatively uniform tension in the web between the reel and the drive.

DESCRIPTION OF THE PREFERRED EMBODIMENTS

Figure 1:
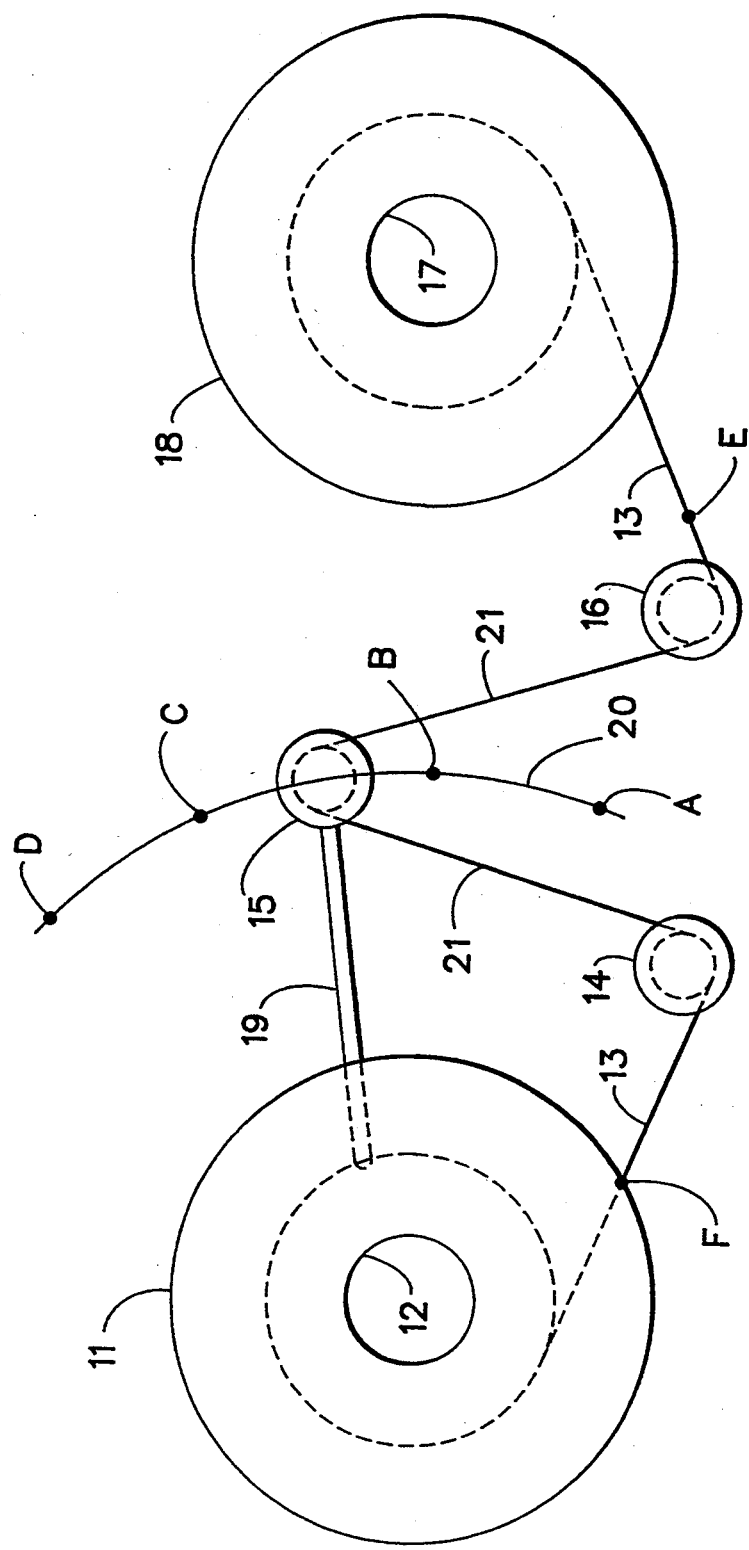
FIG. 1 is a drawing showing a web travelling between a supply reel and a takeup reel.

Referring now to the drawings in detail, and more particularly to FIG. 1, the reference character 11 represents a web supply reel, which has a hub 12. A web 13 is wound on hub 12 and stationary roller 14. Web 13 is also threaded through moving roller 15 and stationary roller 16 and around hub 17 of web takeup reel 18. One skilled in the art may replace hub 17 and reel 18 with any means for driving web 13 e.g. a scan metering drive, a print metering drive, etc. One end of tension arm 19 is fastened to roller 15 by any conventional fasteners i.e. bolts, rivets, etc., and the other end of arm 19 is a spring loaded hinge that provides tension to web 13. Roller 15 with arm 19 attached thereto is capable of moving along arc 20. Points A, B, C and D are an arc 20 and arm 19 is spring loaded towards point D.

A loop 21 of web 13 is formed by the portion of web 13 that travels past rollers 14, 15 and 16. The size of loop 21 changes as roller 15 moves along arc 20. Loop 21 will have a maximum size when roller 15 is at point D and a minimum size when roller 15 is at point A. Loop 21 is formed so that the motion of web 13 at point E (the point web 13 exits roller 16) may be independent of the motion of web 13 at point F (the point web 13 exits supply reel 11). Thus, web 13 may have a constant tension at point E.

Figure 2:
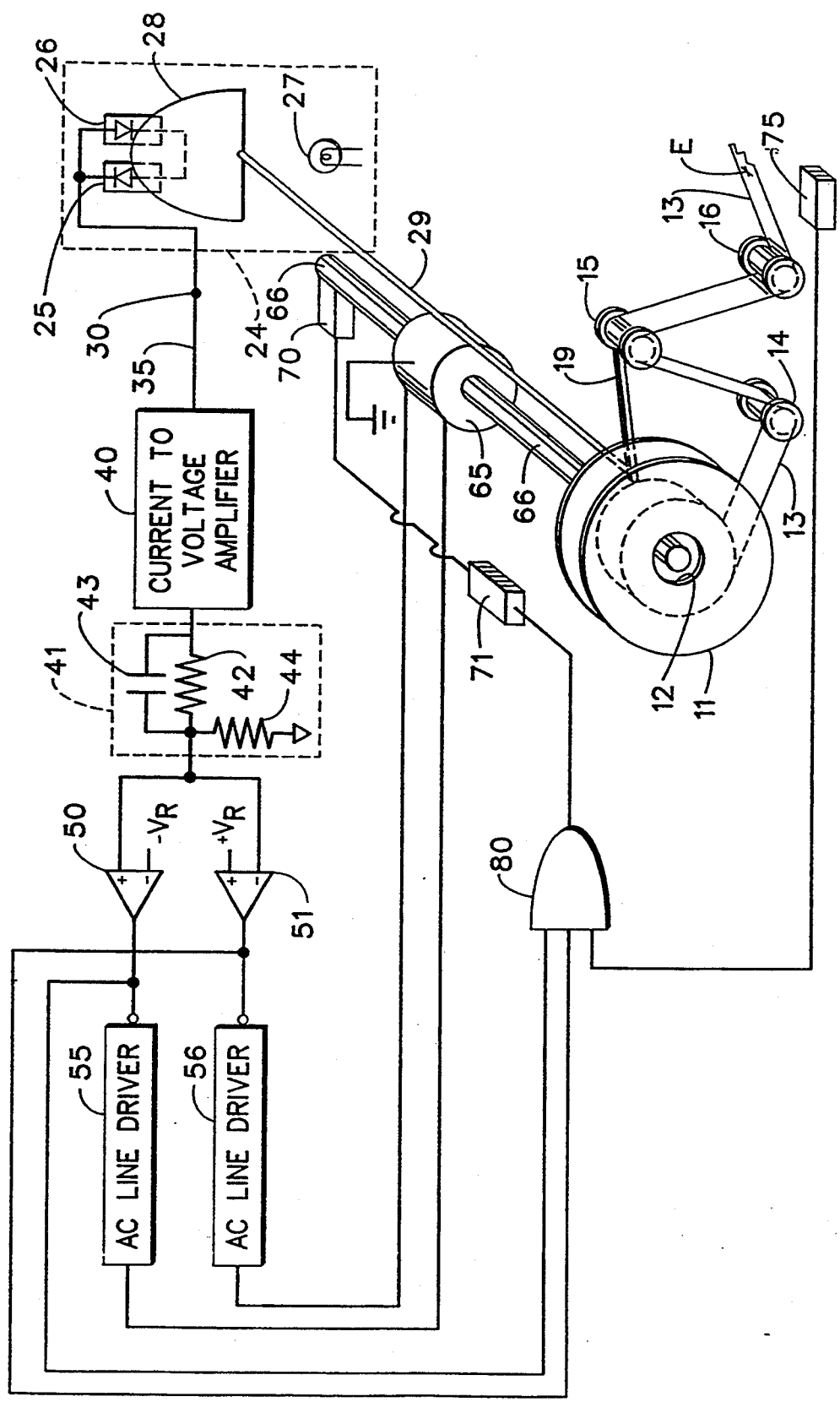
FIG. 2 is a schematic block diagram showing the control circuitry of the tension arm of FIG. 1.

When roller 15 with tension arm 19 attached thereto is between points A and B the circuitry described in FIG. 2 will sense that loop 21 is small. The above circuitry will then turn on AC induction motor 65 (shown in FIG. 2) and cause additional portions of web 13 to come off hub 12 of reel 11 to refill loop 21. When roller 15 with arm 19 attached thereto is between points B and C motor 65 will be off. When roller 15 with arm 19 attached thereto is between points C and D the circuitry described in FIG. 2 will sense that loop 21 is large. The above circuitry will then turn on motor 65 and cause portions of web 13 to move from loop 21 to hub 12 of reel 11.

FIG. 2 is a schematic block diagram of the circuitry that is used to control tension arm 19. Tension arm 19 with roller 15 attached thereto is mechanically attached to angular position transducer 24 via member 29. Transducer 24 is electrically connected to current to voltage amplifier 40 via bidirectional line 35. Amplifier 40 is connected to phase lead network 41 and the output of network 41 is connected to the positive input of comparator 50 and the negative input of comparator 51. The output of comparator 50 is connected to the input of AC line driver 55 and one of the three inputs of AND gate 80. The output of driver 55 is connected to one of the inputs of AC motor 65. The output of comparator 51 is connected to the input of AC line driver 56 and one of the three inputs of AND gate 80. The third input to gate 80 is the output of sensor 75. Sensor 75 is positioned in the vicinity of point E and is used to determine whether or not web 13 is moving past point E. The output of driver 56 is connected to one of the inputs of AC motor 65. AC motor 65 is connected to ground and mechanically connected to hub 12 of reel 11 via shaft 66. Electromechanical brake 70 is connected to shaft 66 of motor 65. The output of gate 80 is connected to the input of brake driver 71 and the output of driver 71 is connected to the input of brake 70.

Angular position transducer 24 is used to determine the position of roller 15 with tension arm 19 attached thereto on arc 20 (shown in FIG. 1). Transducer 24 comprises interconnected photocells 25 and 26 which are positioned side by side, a light source 27 which illuminates photocells 25 and 26; and a semi-circular shadow flag 28 which is positioned between light source 27 and photocells 25 and 26. Flag 28 is mechanically connected to tension arm 19 via member 29.

Shadow flag 28, member 29 and tension arm 19 are adjusted in a manner that when roller 15 with tension arm 19 attached thereto is between points A and B, shadow flag 28 will cover a large portion of photocell 26 and a small portion of photocell 25. The current in photocell 25 will have a greater magnitude than the current in photocell 26. Thus, the current at point 30 of line 35 will be positive. When roller 15 with tension arm 19 attached thereto is between points C and B, shadow flag 28 will almost equally cover photocells 25 and 26. Hence, the current will flow through photocells 25 and 26 and the net resulting current at point 30 of line 35 will be zero. When roller 15 with tension arm 19 attached thereto is between points C and D, shadow flag 28 will cover a large portion of photocell 25 and a small portion of photocell 26. The current in photocell 26 will have a greater magnitude than the current in photocell 25. Thus, the current at point 30 of line 35 will be negative.

As previously mentioned when tension arm 19 moves, shadow flag 28 also moves. The movement of flag 28 causes the current of photocell 25 and the current of photocell 26 to be unequal at point 30 of line 35. The difference between the aforementioned two photocell currents is amplified by current to voltage amplifier 40, and transmitted to one of the ends of 100k resistor 42 and one of the ends of 1.57 UF capacitor 43 of phase lead network 41. The other end of resistor 42 is connected to the other end of capacitor 43 and one of the ends of 100k resistor 44. The other end of resistor 42 is also connected to the positive input of comparator 50 and the negative input of comparator 51. The other end of resistor 44 is connected to ground. When, the maximum transducer voltage of transducer 24 is 7.14 volts and the fastest voltage slew rate of transducer 24 is 64.3 volts, the frequency of network 41 will be 1.432 Hz and the maximum phase lead angle of network 41 will be 19.5 degrees. The above resistors 42 and 44 and capacitor 43 values were calculated by using the frequencies and amplitudes encountered during normal operation of the apparatus of this invention with the removal of phase lead network 41. Phase lead network 41 is used to reduce the oscillations of web 13 in loop 21 during normal operations of supply reel 11 and to provide error rate damping. The foregoing was necessary because the oscillations of loop 21 were severe enough to cause tension arm 19 to move to its top most position and move to its bottom most position. Thus, network 41 supplies feedback for positioning tension arm 19 and roller 15 so that arm 19 and roller 15 will not oscillate excessively or uncontrollably.

The negative input of comparator 50 is connected to reference voltage —AR which is set to approximately —1 volt. The positive input of comparator 50 is connected to reference voltage +VR which is set to approximately +1 volt. This gives approximately a 20% dead zone in which motor 65 is turned off and not supplying or taking up web 13. When the positive input to comparator 50 is lower than the negative input to comparator 50 i.e. - VR comparator 50 will go low and AC line driver 55 will be turned on. Line driver 55 will cause motor 65 to turn on and turn shaft 66 and hub 12 of reel 11 in a clockwise direction. The foregoing will happen when roller 15 with arm 19 attached thereto is between positions C and D and loop 21 is large. The turning on of motor 65 and the rotation of shaft 66 in a clockwise direction will cause portions of loop 21 of web 13 to move from loop 21 to hub 12 of reel 11. When a sufficient portion of web 13 has been removed from loop 21, arm 19 with roller 15 attached thereto will be between points B and C and motor 65 will be turned off. Thus, shaft 66 will not rotate hub 12 of reel 11.

When the negative input to comparator 51 is higher than the positive input to comparator 51 i.e. VR$_2$, comparator 51 will go low and AC line driver 56 will be turned on. Line driver 56 will cause motor 65 to turn on and turn shaft 66 and hub 12 of reel 11 in a counterclockwise direction. The foregoing will happen when arm 19 with roller 15 attached thereto is between positions A and B and a small amount of web 13 is in loop 21. The turning on of motor 65 and the rotation of shaft 66 in a counterclockwise direction will cause additional portions of web 13 to come off hub 12 of reel 11 to refill loop 21. When a sufficient portion of web 13 has been removed from loop 21, arm 19 with roller 15 attached thereto will be between points B and C and motor 65 will be turned off.

When web 13 is not moving into or out of loop 21, tension arm 19 with roller 15 attached thereto will exert enough force on web 13 to turn shaft 66, motor 65 and hub 12 of supply reel 11. Tension arm 19 with roller 15 attached thereto will slowly remove or add a small portion of web 13 from or to reel 11 until roller 15 reaches points B and C on arc 20 (shown in FIG. 1). Motor 65 will then turn on, driving tension arm 19 with roller 15 attached thereto back into the region on arc 20 between points B and C. In this manner, a slow oscillation develops in loop 21.

The foregoing oscillation is eliminated by brake 70, driver 71, gate 80 and sensor 75. When web 13 is not moving past point E sensor 75 will sense this condition and have a high output which is transmitted to one of the three inputs of AND gate 80. If comparator 50 is not instructing driver 55 to cause motor 65 to turn in a clockwise direction and comparator 51 is not instructing driver 56 to cause motor 65 to turn in a counterclockwise direction, comparators 50 and 51 will have a high output. Hence, when the above three conditions are present AND gate 80 will be enabled and driver 71 will cause brake 70 to engage shaft 66 of motor 65. Thus, when roller 15 with tension arm 19 attached thereto is between points B and C of arc 20, brake 70 will engage shaft 66 to prevent motor 65 from turning hub 11 of reel 12. When roller 15 with tension arm 19 attached thereto reaches points B or C, comparator 50 or comparator 51 will disenable gate 80 and driver 71 will cause brake 70 to disengage from shaft 66 (motor 65). At this juncture the output of comparator 50 or comparator 51 will cause line driver 55 or line driver 56 to turn on motor 65, driving roller 15 with tension arm 19 attached thereto between points B and C. At this point brake 70 is engaged unless motion of web 13 is detected at point E by sensor 75.

The above specification describes a new and improved web supply, web takeup tension arm feedback system with error rate damping. It is realized that the above description may indicate to those skilled in the art additional ways in which the principles of this invention may be used without departing from the spirit. It is, therefore, intended that this invention be limited only by the scope of the appended claims.

What is claimed is:

1. A device for controlling tension in a web that travels between a reel and a web drive, said device comprising:
   an AC drive motor connected to said supply reel;
   a first stationary roller supported to move the web, said roller being positioned in the vicinity of a point at which the web leaves the reel;
   a second stationary roller supported to move the web, said second roller being positioned between said first roller and the web drive;
   a movable roller positioned between said first and second stationary rollers in a manner such that the web will move around said movable roller to form a loop so that the length of the web in the loop will be decreased as said movable roller moves towards said first and second stationary rollers and the length of the web in the loop will be increased as said moveable roller moves away from said first and second rollers;
   a member that has one end connected to said movable roller and being spring loaded so that the tension in the web wound around the hub of the reel will vary as said movable roller and said member move to change the size of the loop;
   means for sensing and for regulating the length of the web that forms in the loop by turning on and off the AC drive motor in a manner such that if more than a predetermined length of the web is in the loop said sensing and regulating means will remove a portion of the web from the loop to maintain a relatively uniform tension in the web between the reel and the web drive, and if less than a predetermined length of the web is in the loop said sensing and regulating means will add a portion of the web to the loop to maintain a relatively uniform tension in the web between the reel and the web drive.

2. A device according to claim 1 wherein said sensing and regulating means includes an shaft that is connected to a hub of the reel at one end and to the AC drive motor at the other end of said shaft, so that when said AC drive motor rotates in a first direction, said shaft will rotate the hub of the reel in a first direction to decrease the size of the loop and when said AC drive motor rotates in a second direction said shaft will rotate the hub of the reel in a second direction to increase the size of the loop.

3. A device according to claim 2 wherein said sensing and regulating means further including means for braking said AC drive motor to reduce oscillation that may develop in the loop when said AC drive motor is not operating and when said web in not being driven.

4. A device according to claim 3 wherein said braking means includes:
   an electromechanical brake coupled to said AC drive motor, so that said brake will engage said AC drive motor to prevent said AC drive motor from turning the hub of the reel, and
   means coupled to said brake and said sensing means for controlling the engagement and disengagement of said brake with said shaft.

5. A device according to claim 3 wherein sensing and regulating means further includes:
   a detector that determines whether or not the web is moving past said second roller; and
   means for determining whether or not said AC drive motor is rotating in a first direction or in a second direction,
   whereby, if said AC drive motor is not rotating in a first direction or in a second direction and no web is moving past said detector, said brake will engage said AC drive motor and if the web is moving past said detector and said AC drive motor is turning in a first or second direction said brake will be disengaged from said AC drive motor.

6. The device claimed in claim 1, wherein said sensing and regulating means includes:
   a transducer that is connected to said member, said transducer produces a signal that indicates the position of said movable roller;
   an amplifier that is coupled to the signal of said transducer, said amplifier changes the signal into a voltage;
   a phase lead network coupled to said amplifier, said network for determining the position and rate of movement of said member which can used to control the AC drive motor so as to minimize said member from oscillating excessively and changing the length of the loop;

coupling means coupled to the output of said network for comparing the voltage signals produced by said amplifier and said phase lead network with signals representing predetermined positions of said movable roller and selecting the amount of web that is to be added or removed from the loop by said regulating means to maintain a relatively uniform tension in the web between the reel and the web drive; and driving means coupled to said comparing means and said AC drive motor, said driving means cause said AC drive motor to rotate in a first direction to decrease the length of the loop and to rotate in a second direction to increase the length of the loop.

7. The device claimed in claim 6, wherein said transducer includes:

a plurality of interconnected photocells which are positioned side by side;

a light source that illuminates said photocells;

a shadow flag between said light source and said photocells, said flag is connected to said member so that said flag will cover different portions of said photocells when said member has different orientations to allow said photocells to output current signals that indicate the orientation of said member.

* * * * *